(12) United States Patent
Cho et al.

(10) Patent No.: US 8,782,353 B2
(45) Date of Patent: Jul. 15, 2014

(54) INFORMATION PROCESSING DEVICE HAVING DATA FIELD AND OPERATION METHODS OF THE SAME

(75) Inventors: Jun-Young Cho, Seongnam-si (KR); Woon-Jae Chung, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1048 days.

(21) Appl. No.: 12/248,957

(22) Filed: Oct. 10, 2008

(65) Prior Publication Data

US 2009/0132623 A1 May 21, 2009

(30) Foreign Application Priority Data

Oct. 10, 2007 (KR) .................. 10-2007-0102205

(51) Int. Cl.
*G06F 12/00* (2006.01)
(52) U.S. Cl.
USPC .......................................................... 711/154
(58) Field of Classification Search
CPC ...... G06F 3/061; G06F 3/0643; G06F 3/0688
See application file for complete search history.

(56) References Cited

U.S. PATENT DOCUMENTS

| | | | | |
|---|---|---|---|---|
| 5,651,136 A * | 7/1997 | Denton et al. | ................ | 711/118 |
| 5,956,745 A * | 9/1999 | Bradford et al. | .............. | 711/137 |
| 6,449,689 B1 * | 9/2002 | Corcoran et al. | .............. | 711/113 |
| 6,745,311 B2 * | 6/2004 | Fabrizio et al. | ................ | 711/172 |
| 7,096,327 B2 * | 8/2006 | Korst et al. | .................... | 711/154 |
| 7,254,668 B1 * | 8/2007 | Chang et al. | .................... | 711/103 |
| 7,424,574 B1 * | 9/2008 | Ahrens et al. | .................. | 711/114 |
| 7,593,263 B2 * | 9/2009 | Sokolov et al. | .......... | 365/185.17 |
| 2003/0018871 A1 * | 1/2003 | March et al. | ................... | 711/173 |
| 2007/0162707 A1 * | 7/2007 | So et al. | ........................ | 711/154 |
| 2007/0226443 A1 * | 9/2007 | Giampaolo | ................... | 711/170 |
| 2009/0077327 A1 * | 3/2009 | Hara | ............................ | 711/154 |

FOREIGN PATENT DOCUMENTS

| | | |
|---|---|---|
| JP | 2001-265628 | 9/2001 |
| JP | 2001-265633 | 9/2001 |
| JP | 2002-041341 | 2/2002 |
| WO | WO2005055064 A1 | 6/2005 |

* cited by examiner

*Primary Examiner* — Matthew Bradley
*Assistant Examiner* — Ramon A Mercado
(74) *Attorney, Agent, or Firm* — Volentine & Whitt, PLLC

(57) ABSTRACT

An information processing device includes a memory array and a controller. The memory array includes a data field that stores file data and a management information field that stores information regarding the data field. The controller controls a writing operation to the memory array. The controller stores a portion of the file data, corresponding to a product of a positive-integer and a predetermined unit block size, in the data field by block units, with reference to the data field information of the management information field.

19 Claims, 9 Drawing Sheets

INFORMATION PROCESSING DEVICE HAVING DATA FIELD AND OPERATION METHODS OF THE SAME

PRIORITY CLAIM

A claim of priority is made to Korean Patent Application No. 10-2007-0102205 filed on Oct. 10, 2007, in the Korean Intellectual Property Office, the subject matter of which is hereby incorporated by reference.

SUMMARY

The present invention relates to information processing, and more particularly, to an information processing device having a data field and operation methods of the same.

Management of data stored in archival areas of recording media, such as semiconductor memories, magnetic disks, and magneto-optical disks, is conducted by file systems. In a file system for storing and retrieving data, a file allocation table (FAT) system is generally used, for example, in information processing systems, such as mobile processing devices or personal computers. A FAT file system employs a FAT for managing file management information, including physical locations of data forming directory entries and management contents.

An archival area of a FAT file system is divided into a data field, which stores data forming file contents (hereinafter, referred to as "file data"), and a management information field, which stores information about the file data stored in the data field. The data field is divided into clusters, which are the smallest physical access units. The size of a cluster is typically determined in the range from 2048 bytes to 32768 bytes, e.g., in accordance with a volume of a memory device. Multiple clusters form a memory block.

The management information field includes a FAT, and the FAT includes multiple FAT entries respectively corresponding to the clusters. Each entry denotes whether the corresponding cluster has been used or not, representing locations of file data stored in the data field in a form of link list. Files are denoted in a file structure of directory entries and stored in the management information field by allocation. The directory entry stores a file name, a file size and start cluster information.

An aspect of the present invention provides an information processing device including a memory array and a controller. The memory array includes a data field that stores file data and a management information field that stores information regarding the data field. The controller controls a writing operation to the memory array. The controller stores a portion of the file data, corresponding to a product of a positive-integer and a predetermined unit block size, in the data field by block units, with reference to the data field information of the management information field.

The information management information field may include a file allocation table for storing the data field information. The data field may include a first data region having multiple cluster blocks, each cluster block including multiple clusters, and a second data region having multiple clusters. The controller may include a first controller for controlling the writing operation in block units, a second controller for controlling the writing operation in cluster units, and a data processor for dividing the file data by the cluster block size, providing the first controller with the portion of the file data that corresponds to the product of the positive-integer and the cluster block size, and providing the second controller with a remainder of the file data.

The file allocation table may include multiple entries corresponding to the clusters of the data field. The entries store use status information corresponding to the clusters. Also, the entries may identify the clusters of the data field as being used by one of the first and second controllers and store link information indicating locations of next data.

The first controller may search for empty cluster blocks, with reference to cluster information stored in the entries corresponding to a first cluster of each of the cluster blocks of the first data region. The first controller may store the file data, which corresponds to the product of the positive-integer and the cluster block size, in the empty cluster blocks from the data processor in block units.

The second controller may search for empty clusters, with reference to information stored in the entries of the clusters of the second data region, and store the remainder of the file data in the empty clusters from the data processor in cluster units.

Another aspect of the present invention provides a writing method for an information processing device having a data field that includes a first data region storing file data in cluster block units and a second data region storing file data in cluster units. The method includes (a) dividing a write-requested file data into at least one cluster block; (b) finding empty cluster blocks in the first data region; (c) storing first file data in the found cluster blocks by cluster block units, the first file data corresponding to a share determined by the dividing of the write-requested file data into the at least one cluster block; (d) finding empty clusters from the second data region; and (e) storing second file data in the found empty clusters by cluster units, the second file data corresponding to a remainder from the dividing of the write-requested file data in the at least one cluster block. Each cluster block includes multiple clusters.

The first file data may be sequentially stored until the first file data corresponding to the share is completely stored in the cluster blocks by step (c). Also, the second file data may be sequentially stored until the second file data corresponding to the remainder is completely stored in the clusters by step (e).

Another aspect of the present invention provides an information processing device including a memory array and a controller. The memory array includes a data field storing file data and a management information field storing information of the data field and information of the file data, at least a portion of the file data being stored in the data field in block units. The controller controls a reading operation to the memory array. The controller reads the portion of the file data stored in block units from the data field in block units, with reference to the data field information and the file data information that are reserved in the management information field.

The management information field may include a file allocation table for storing the data field information. The data field may include a first data region having multiple cluster blocks, each of which including multiple clusters, and a second data field having multiple clusters. The controller may include a first controller for controlling the reading operation in block units, and a second controller for controlling the reading operation in cluster units. The file data information may be reserved in an arbitrary area of the management information field.

The file allocation table may include multiple entries corresponding to the clusters of the data field. The multiple entries store link information and use status information corresponding to the clusters. The link information may indicate clusters storing file data to be subsequently read.

The file data information may include information identifying a start cluster, and the first controller may read data from cluster blocks, which include the start cluster and store the file data, in block units with reference to the start cluster information.

The first controller may read data from cluster blocks, which store the subsequent data, in block units with reference to the link information stored in the entries corresponding to the last clusters of the cluster blocks of the first data region that store the file data. The second controller may read data from clusters, which store the subsequent data, in cluster units with reference to the link information stored in the entries corresponding to the clusters of the second data region that store the file data.

Another aspect of the present invention provides a reading method for an information processing device having a data field that includes a first data region storing file data in cluster block units and a second data region storing file data in cluster units. The method includes (a) searching the first data region for cluster blocks storing first data of a read-requested file; (b) reading the first data from the cluster blocks of the first data region in cluster block units; (c) searching the second data region for clusters storing second data of the read-requested file; and (d) reading the second data from the clusters of the second data region in cluster units. Each cluster block includes multiple clusters.

The first data may be sequentially read from the cluster blocks of the first data region until the data of the read-requested file is completely read out from the cluster blocks of the first data region by the step (b). Also, the second data may be sequentially read from the clusters of the second data region until the data of the read-requested file is completely read out from the clusters of the second data region by the step (d).

Another aspect of the present invention provides an information processing device. The device includes a data field having a first data region including multiple cluster blocks, each of which includes multiple clusters, and storing file data in block units, and a second data region including clusters and storing file data in cluster units; a first controller for erasing the file data, stored in the first data region in block units, from the first data region in block units; and a second controller for erasing the file data, stored in the second data region in cluster units, from the second data region in block units including multiple clusters. When a block of the second data region includes data from another file excluded from an erasing request, the second controller copies the data to an arbitrary data area before erasing the block of the second data region.

Another aspect of the present invention provides an erasing method for an information processing device including a data field that includes a first data region storing file data in cluster block units and a second data region storing file data in cluster units. The method includes erasing a first portion of erase-requested file data from cluster blocks of the first data region in cluster block units; locating other file data, that is not to be erased, in a block of the second data that includes a second portion of the erase-requested file data; and copying the other file data into an arbitrary data area and erasing the block of the second data region that stores the second portion of erase-requested file data. The cluster block includes multiple clusters.

BRIEF DESCRIPTION OF THE DRAWINGS

The embodiments of the present invention will be described with reference to the attached drawings, wherein like reference numerals refer to like parts unless otherwise specified, and in which.

DETAILED DESCRIPTION OF THE EMBODIMENTS

Figure 1:
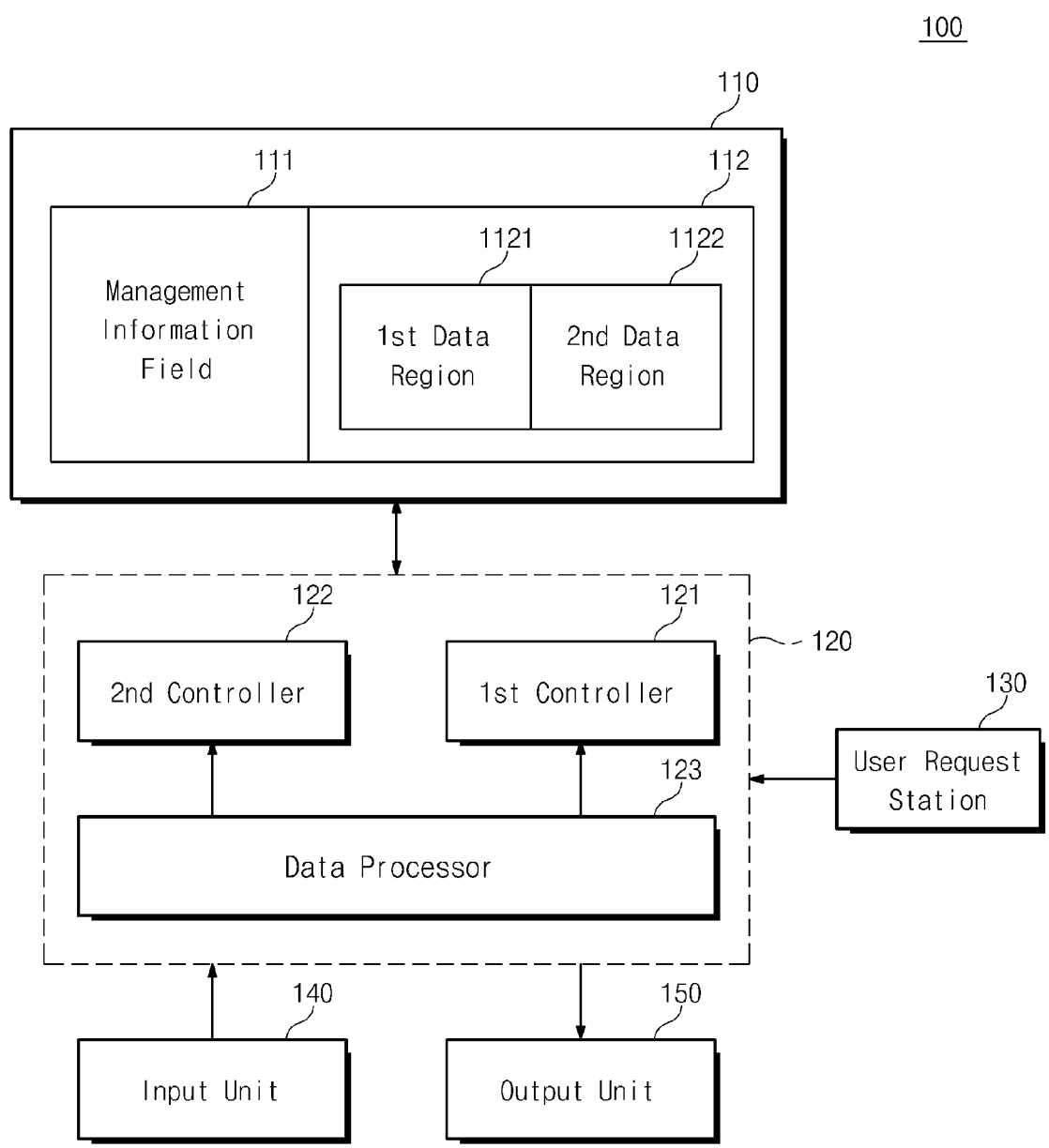
FIG. 1 is a block diagram of an information processing device, according to an embodiment of the present invention.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

A typical operation for storing data forming file contents (hereinafter, referred to as "file data") in an information processing device using a FAT file system is as follows. When storing a new file in the data field, a directory entry is allocated to the data field in correspondence with the new file. The data field is searched for an empty (or unused) cluster with reference to the FAT, in order to write file data. The empty cluster is allocated to the new file. A FAT entry corresponding to the allocated empty cluster is updated to indicate that the empty cluster is in use, and the empty cluster stores the file data. If the cluster is a start cluster first used for storing the file data, a location of the start cluster is stored in the directory entry.

When the size of file data is large, the file data is divisionally stored in multiple clusters. In this case, a FAT entry corresponding to one cluster storing the file data stores a number of its successive clusters in which the same file data is recorded. For instance, assuming that four empty clusters are numbered #10~#13, the file data is sized in a volume capable of being stored in the four clusters. For example, in storing the file data, the cluster #10 is determined to be empty, a FAT entry is updated in correspondence with the cluster #10, and the file data is partly stored in the cluster #10. Since the cluster #10 is the start cluster, the directory entry stores the number 10. Thereafter, the cluster #11 is determined to be empty and the number 11 is stored in the FAT entry corresponding to the cluster #10. Updating a FAT entry corresponding to the cluster #11, the file data is partly stored in the cluster #11. This operation is repeated until the file data is stored entirely. Thus, the number 12 is stored in a FAT entry corresponding to the cluster #11 and the number 13 is stored in an FAT entry corresponding to the cluster #12. The cluster numbers stored each in the FAT entries corresponding to the clusters are called link information. The cluster #13 stores the last part of the file data and a FAT entry corresponding to the cluster #13 stores a value, e.g., "0xFFF", for identifying the end of the same file data.

A typical operation for reading a file in the information processing device by means of the FAT file system is as follows. First, a directory entry of a file is located from requested file names. Data stored in the start cluster is loaded with reference to the start cluster number stored in the directory entry. Data stored in the next cluster are loaded with reference to the next cluster number stored in the FAT entry corresponding to the start cluster number. As such, data from the clusters #10 through #13 are each loaded with reference to information of the FAT entries respective to the clusters #10~#13.

A typical operation for erasing files using the FAT file system in the information processing device is as follows. It is assumed that an archival area of the FAT file system includes a flash memory array formed of multiple blocks. A flash memory typically conducts an erasing operation in block units. When each cluster is 32 KB and each flash memory block is 128 KB, for example, one memory block includes four clusters. In this case, file data has been stored in cluster units, so data from different files may be stored in one memory block. For example, a first file may be stored in two clusters (64 KB) of a 128 KB memory block and a second file may be stored in the other two clusters (64 KB) of the memory block. If the first file needs to be erased independently, the operation is performed to erase the entire memory block storing the first file. Therefore, the second file is erased along with the first file. In order to prevent losing the data from the second file while erasing the first file, the second file is copied into another block before the memory block storing the first and second files is erased.

FIG. 1 is a block diagram of an information processing device, according to an illustrative embodiment of the present invention.

Referring to FIG. 1, the information processing device 100 includes a memory array 110, a controller 120, a user request station 130, an input unit 140, and an output unit 150.

The memory array 110 is divided into a data field 112 for storing file data, and a management information field 111 for storing information about the file data stored in the data field 112. The data field 112 includes multiple clusters and the management information field 111 includes multiple FAT entries respectively corresponding to the clusters (described below with respect to FIG. 2). The data field 112 is organized into first a data region 1121 formed of multiple blocks, each of which includes multiple clusters, and a second data region 1122 formed of multiple clusters (described below with respect to FIG. 2).

The controller 120 includes a first controller 121, a second controller 122, and a data processor 123. The user request station 130 may be used to interface with the controller 120, for example, to request writing, reading, and erasing operations with respect to the file data. The user request station 130 may include a mouse, a keyboard, and/or a touch pad, for example. The controller 120 controls the writing, reading, and erasing operations with respect to the file data in the memory array 110, e.g., in compliance with requests from the user request station 130.

The first controller 121 controls the writing, reading, and erasing operations with respect to file data in the first data region 1121. The first controller stores file data in the first data region 1121, and information about the file data in the management information field 111 corresponding to the first data region 1121. The second controller 122 controls the writing, reading, and erasing operations with respect to file data in the second data region 1122. The second controller stores file data in the second data region 1122, and information about the file data in the management information field 111 corresponding to the second data region 1122.

In a writing operation, the data processor 123 of the controller 120 divides an input file into predetermined volumes. The data processor 123 then provides the first controller 121 with a portion of the input file data that has been evenly divided into the predetermined volumes, and provides the second controller 122 with the remainder of input file data.

More particularly, when there is a request for writing a specific file (i.e., a write-requested file), e.g., from the user request station 130, the data processor 123 receives the specific file through the input unit 140. In this example, the write-requested file is at least larger than a block unit. The data processor 123 divides the write-requested file into a number of blocks having a predetermined size, and determines the number of remaining clusters (if any). The blocks form the data field 112. In other words, the file size N may be indicated by the following relationship, in which n is a positive integer indicating a share, F is the predetermined size of the blocks, and R is a number of clusters remaining after dividing the file size N by the predetermined size F:

$$N = n \times F + R \tag{1}$$

Here, F is larger than n. The data processor 123 provides the first controller 121 with file data corresponding to n times F. Then, the first controller 121 accepts information about the data field 112, which is stored in the management information field 111, and searches the first data region 1121 for an empty area with reference to the information about the data field 112. The empty area is searched in the first data region 1121 in block units. When an empty area is located, the first controller 121 stores the file data in the empty area of the first data region 1121 in block units. The first controller 121 stores information regarding used clusters (within the block units) and information about the file in the management information field 111.

After storing the file data corresponding to n times F, the data processor 123 provides the second controller 122 with the remaining file data corresponding to R. Similarly, the second controller 122 searches the second data region 1122 of the data field 112 for an empty area with reference to information from the management information field 111. The empty area is searched in the second data region 1122 in cluster units. The second controller 122 stores the remaining file data in the empty area of the second data region 1122 in cluster units and stores information regarding used clusters in the management information field 111.

The writing operation is thus performed by searching for empty areas, storing file data, and storing associated cluster information. Typically, if all of the writing operations are conducted in cluster units, file data to be stored in blocks are written into the data field by repeatedly executing the writing operation for each of the clusters forming the block. In contrast, the information processing device 100, according to the present embodiment, executes the writing operation with respect to the first data region 1121 in the block units, thus storing a portion of the file data in block units, as opposed to cluster units, by grouping multiple clusters to be written in block size. The information processing device 100 is therefore able to more efficiently conduct the writing operation.

When there is a request for reading a specific file (i.e., read-requested file) from in the memory array 110, e.g., from the user request station 130, the information processing device 100 operates as follows. In this example, the read-requested file data stored in the memory array 110 is at least larger than a block unit. The first controller 121 reads the file data, which is stored in the first data region 1121 by blocks, from the first data region 1121 in block units with reference to information stored in the management information field 111 about the file data and clusters. After the first controller 121 completes the reading operation, the second controller 122 reads data of the read-requested file, which is stored in the second data region 1122 by clusters, from the second data region 1122 in cluster units, with reference to the cluster information stored in the management information field 111. The file data read from the data region 112 may be provided externally through the output unit 150. The cluster information corresponds to information about the clusters storing the read-requested file.

Typically, when all of the reading operations are executed in cluster units, the reading operations refer every time to the cluster information, stored in the management information field 111, in order to read the file data from the blocks, and all file data is read out in cluster units. In contrast, the information processing device 100, according to the present embodiment, executes the reading operation of the first data region 1121 in block units to read at least a portion of the file data. Only the remainder of the file data, stored in the second data region 1122, is read out in cluster units. Thus, the information processing device 100 is able to more efficiently conduct the reading operation.

When there is a request for erasing a specific file (i.e., erase-requested file) from the memory array 110, e.g., by the user request station 130, the first controller 121 erases data of the erase-requested file from the first data region 1121 in block units, and the second controller 122 erases data of the erase-requested file from the second data region 1121 in cluster units, where the data of the erase-requested file is stored in the first data region 1121 by blocks and in the second data region 1122 by clusters. As discussed above, since the file data was stored by the first controller 121 in block units, each block of the first data region 1121 does not include data (or clusters of data) different from the file data. Thus, the file data may be erased by block units from the first data region 1121 during the erasing operation, without first having to copy data from clusters within the blocks which are not to be erased. This differs from a conventional erase operation. As a result, the information processing device 100 is able to conduct the erasing operation more efficiently.

With respect to the operations of the information processing device 100, the functionality of the second controller 122 may be similar to that of a conventional device managing files according to cluster units, as discussed above.

The file management system of the information processing device, according to the present embodiment, manages files in both block and cluster units. Since a file should be managed in block units at first, the file should be larger than a block unit of the data field 1121. For this reason, the information processing device 100 according to the present embodiment is appropriate for managing large files.

Accordingly, the file management system of the information processing system 100 is able to efficiently manage files, hence improving performance. For example, devices such as digital multimedia broadcasting (DMB) machines, MP3 players, motion-picture players, and the like, typically use large volumes of multimedia data. The information processing device 100 can efficiently manage the multimedia data by processing at least a portion of the data in block units.

Figure 2:
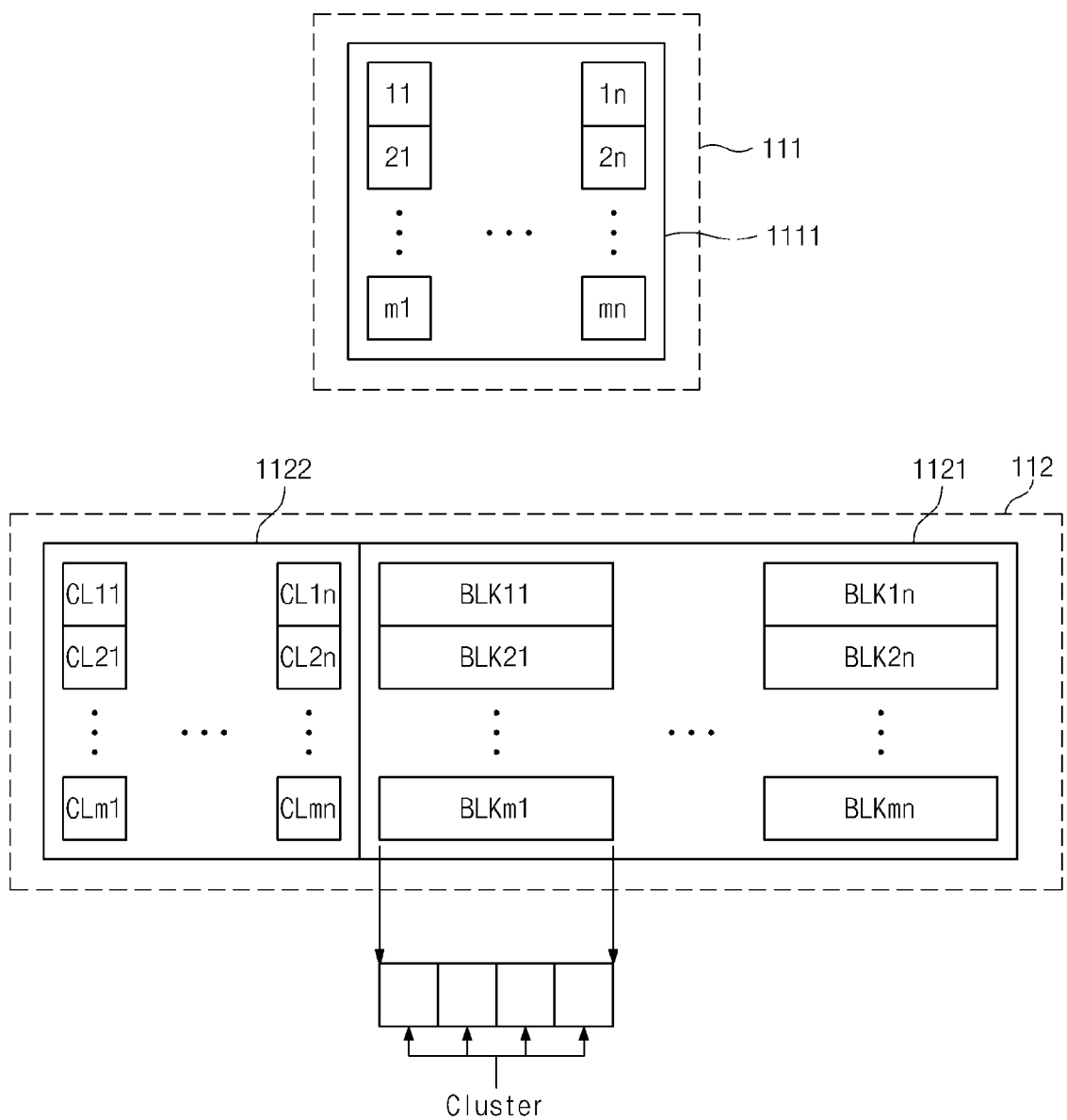
FIG. 2 is a block diagram illustrating a management information field and a data field of FIG. 1, according to an embodiment of the present invention.

FIG. 2 is a block diagram showing structures of the management information field and the data field of FIG. 1, according to an illustrative embodiment of the present invention.

Referring to FIG. 2, the management information field 111 includes FAT region 1111. The FAT region 1111 includes multiple FAT entries 11~mn. The data field 112 includes the first and second data regions 1121 and 1122. The first data region 1121 includes multiple blocks BLK11~BLKmn, each of which is formed of multiple clusters. The second data region 1122 includes multiple clusters CL11~CLmn. Thus, the data field 112 is formed of multiple clusters in substance. The multiple clusters of the data field 112 correspond to the FAT entries 11~mn of the FAT region 1111.

In the depicted embodiment, it is assumed that each block is formed of four clusters, as shown with respect to block BLKm1, and each cluster has a size of 32 KB. It is understood, however, that block and cluster sizes may vary in other illustrative configurations. As each block is composed of four 32 KB clusters, the block has a total size of 128 KB. Hereinafter, the block is referred to as "cluster block".

Figure 3:
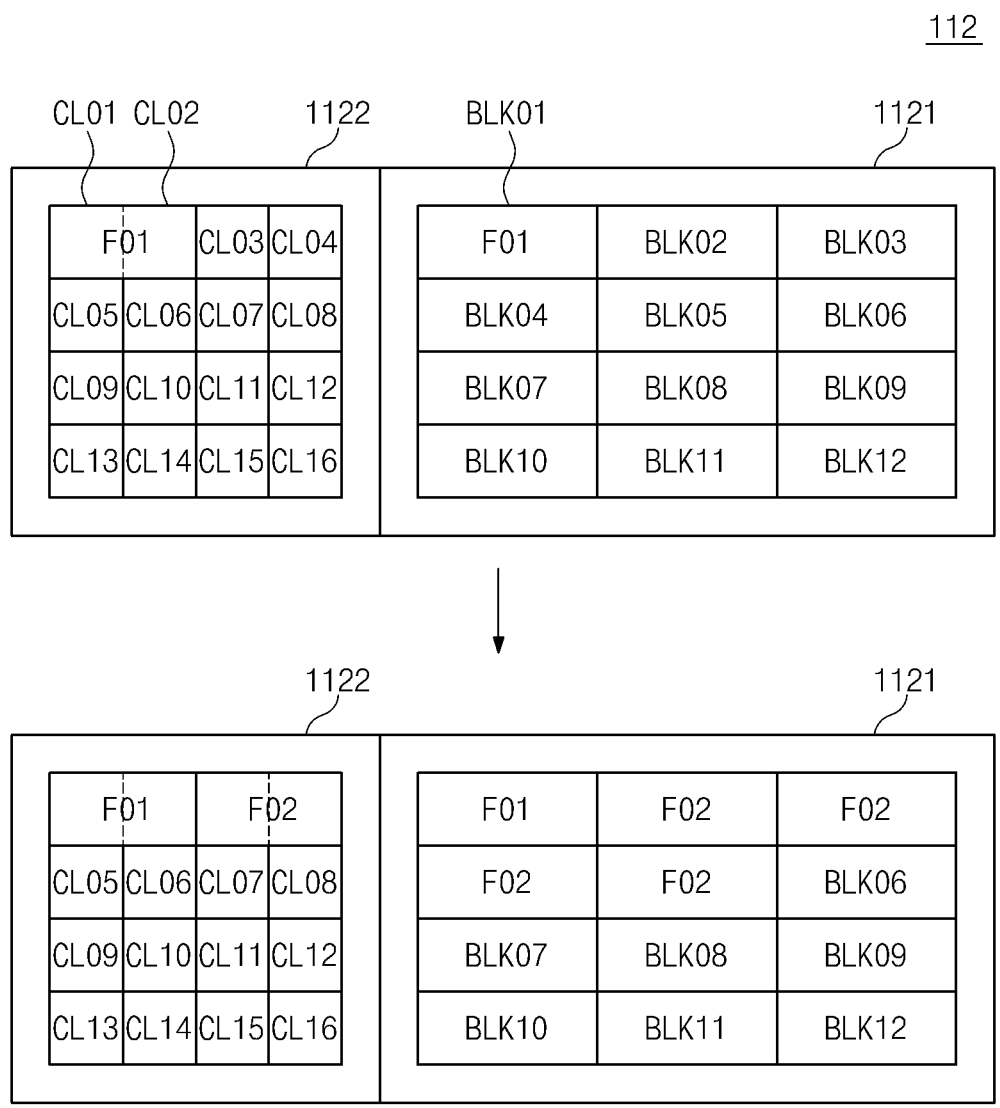
FIGS. 3 through 5 are diagrams illustrating conditions of a management information field and a data field during a writing operation, according to an embodiment of the present invention.
Figure 4:
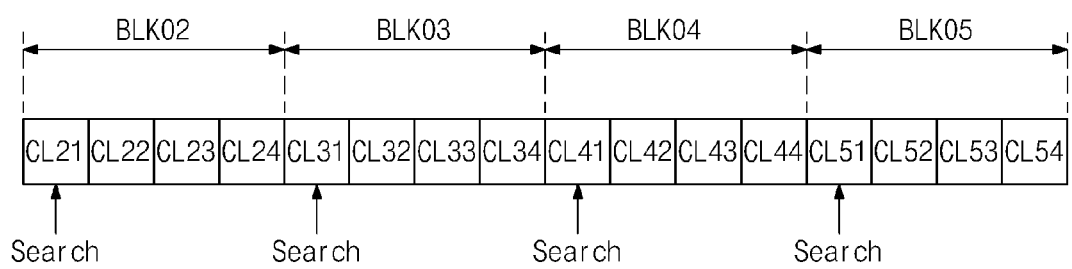
Figure 5:
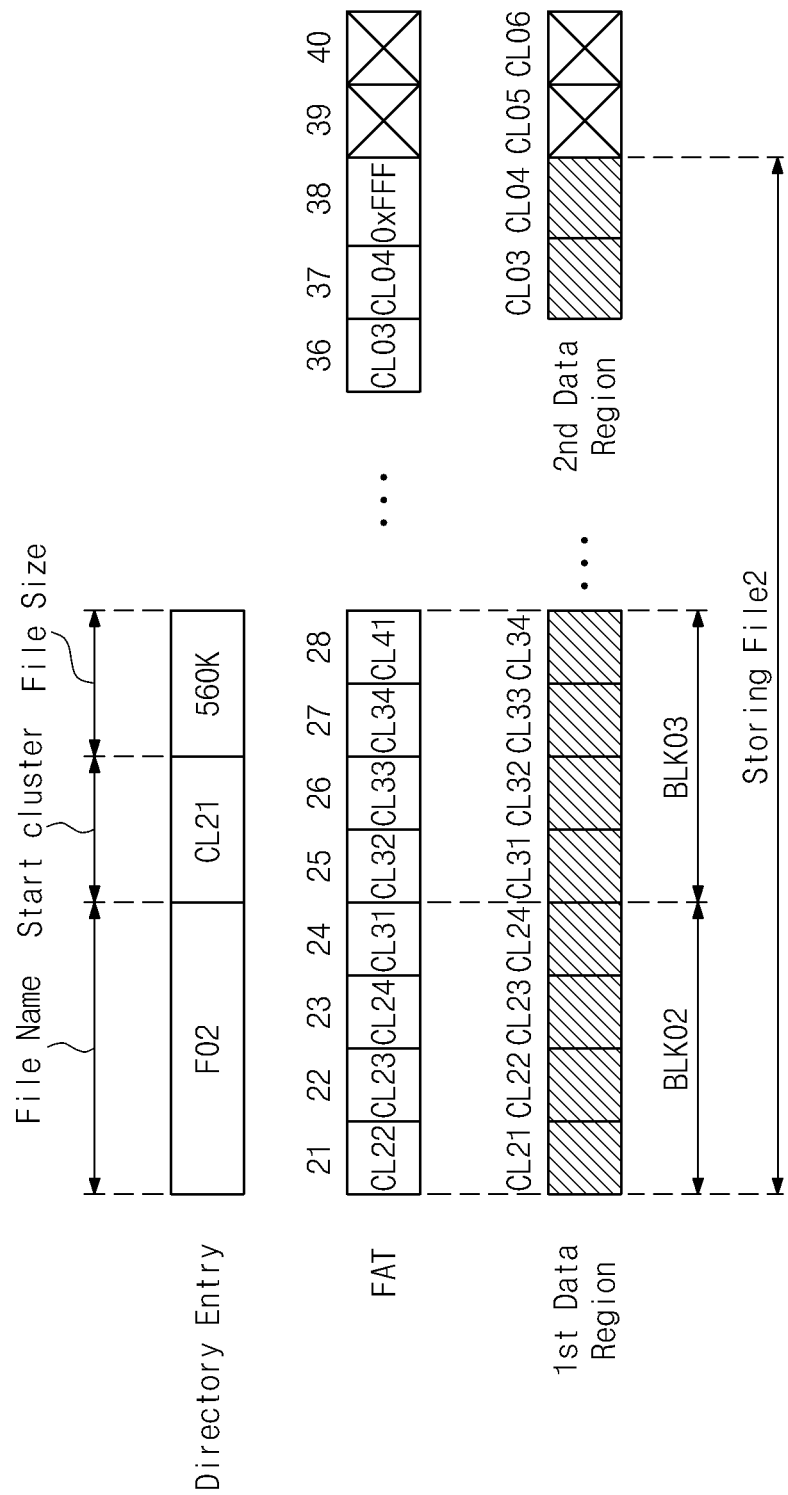

FIGS. 3 through 5 show conditions of the management information field and the data field during a writing operation, according to an illustrative embodiment.

FIG. 3 shows the condition of the data field during the writing operation. The data field 112 shown in FIG. 3 is divided into the first data region 1121 formed of 12 cluster blocks BLK01~BLK12, and the second data region 1122 formed of 16 clusters CL01~CL16. FIG. 4 scales up the cluster blocks BLK02~BLK05 of FIG. 3 to show associated cluster units. FIG. 5 illustrates conditions of the FAT and directory entries corresponding to each of the clusters storing file data by the writing operation.

Referring first to FIG. 3, it is assumed that a first file F01 has been stored in the cluster block BLK01 of the first data region 1121 and in the clusters CL01 and CL02 of the second data region 1122. The other blocks and clusters are empty (or unused).

An example of storing a second file F02 of 560 KB by the information processing device 100 is described below. The size of the second file F02 (560 KB) is divided by the size of the unit block (128 KB), resulting in a share of 4 blocks with a remainder of 48 KB. Referring to Equation (1), the unit block size is F, the share is n, and the remainder is R. Therefore, n (4) times F (128 KB) or 512 KB of the second file F02 is stored in block units and R (48 KB) is stored in cluster units. Accordingly, the second file F02 may be stored in four cluster blocks of the first data region 1121 and two clusters of the second data region 1222.

In the writing operation of the second file F02, the first data region 1121 is searched for an empty (or unused) cluster block with reference to the FAT region 1111. In particular, the FAT entries of the FAT region 1111 are referenced in association with the first cluster of each cluster block. For instance, referring to FIG. 4, a FAT entry corresponding to the first cluster CL21 of the cluster block BLK02 is referenced. Since the cluster block BLK02 is empty, the FAT entry corresponding to the first cluster CL21 sets the cluster CL21 as being unused. As the writing and erasing operations are performed in block units, an empty cluster block may be located by simply checking the condition of the first cluster of each block. The availability and/or status of other blocks are likewise determined in the aforementioned manner.

After determining that the cluster block BLK02 is empty, data of the second file F02 is stored in the cluster block BLK02. In particular, the data of the second file F02 may be sequentially stored in four clusters CL21~CL24. Then, the search continues for another empty (or unused) cluster, and when one is located, the operation is repeated. Through this repetition of the searching and storing steps, 512 KB data of the second file F02 are stored in the cluster blocks BLK02~BLK05, as indicated by the bottom figure of FIG. 3. The rest of the second file F02, i.e., 48 KB of the 560 KB, is stored in two clusters CL03 and CL04, for example, of the second data region 1122, in a known manner.

Referring to FIG. 5, the directory entry stores file data information about a file name, a start cluster, and a file size. Referring to a general case, the directory entry is stored in the management information field 111 by allocation while writing the second file F02. A start cluster, from which data of the second file F02 begins to be stored during the writing operation, is the first cluster CL21 of the cluster block BLK02. Therefore, as illustrated in FIG. 5, positional information about the first cluster CL21 of the cluster block BLK02 is stored in a start cluster area of the directory entry. Moreover, as also illustrated in FIG. 5, the file name F02 is stored in a file name area and a file size is recorded in a file size area.

The data of the second file F02 (hereinafter, referred to as "second file data") is divisionally stored in the cluster blocks BLK02~BLK05 of the first data region 1121 and the clusters CL03 and CL04 of the second data region 1122. After partially storing the second file data in the cluster block BLK02 in sequence, the FAT entries 21~24 corresponding to the clusters CL21~CL24 of the cluster blocks BLK02 indicate that the clusters CL21~CL24 are being used. Although not shown in FIG. 5, the use status may be denoted by "0" or "1". For example, the use status of "0" may indicate that the corresponding cluster is not in use, and the use status of "1" may indicate that the corresponding cluster is in use. The FAT entries 21~23 store their corresponding link information of CL22~CL24, respectively.

After storing the second file data in the cluster block BLK03 in sequence, the FAT entries 25~28, respectively corresponding to the clusters CL31~CL34 of the cluster block BLK03 indicate that the clusters CL31~CL34 are being used. Also, the FAT entry 24 corresponding to the last cluster CL24 of the previous cluster block BLK02 stores corresponding link information of CL31. The FAT entries 25~27 store corresponding link information of CL32~CL34, respectively.

After storing a portion of the second file data in the cluster blocks BLK02~BLK05, the rest of the second file data is divisionally stored in the clusters CL03 and CL04. After partially storing the second file data in the cluster CL03, the FAT entry 36, which corresponds to the last cluster CL54 of the previous cluster block BLK05, stores link information of CL03. By repeating these steps, the last cluster of the second file data is stored in the cluster CL04 and the FAT entry 37 stores link information of CL04. Since the last of the second file data is stored in the cluster CL04, the cluster CL04 is not used any more. The FAT entry 38 corresponding to the cluster CL04 includes an entry indicating that there is no more link information. For example, the FAT entry 38 may store "0xFFF".

As discussed above, the information processing device 100 executes the writing operation to the first data region 1121 in the block units, storing part of the file data, which can be written by block size in block units. Thus, the information processing device 100 is able to conduct the writing operation more efficiently.

The reading operation may also be described with reference to FIGS. 3 through 5, which show conditions of the management information field and the data field, according to an illustrative embodiment.

When there is a request for reading the second file F02, the second file data is successively read out from the start cluster CL21 through the clusters CL22~CL24 with reference to the start cluster's information stored in the directory entry. In particular, the second file data is partially read out from the cluster block BLK02. The link information stored in the FAT entry 24, which corresponds to the last cluster CL24, indicates the cluster CL31 of the next block BLK03. Thus, the second file data is partly read out from the cluster block BLK03 with reference to the link information stored in the FAT entry 24. This operation is repeated to read out the second file data from the cluster blocks BLK02~BLK05 of the first data region 1121. The remainder of the second file data is read out from the clusters CL03 and CL04, as described above.

Accordingly, the information processing device 100 executes the reading operation of the first data region 1121 in block units, reading a portion of the file data, which can be read by block size, in block units. Thus, the information processing device 100 is able to conduct the reading operation more efficiently.

Figure 6:
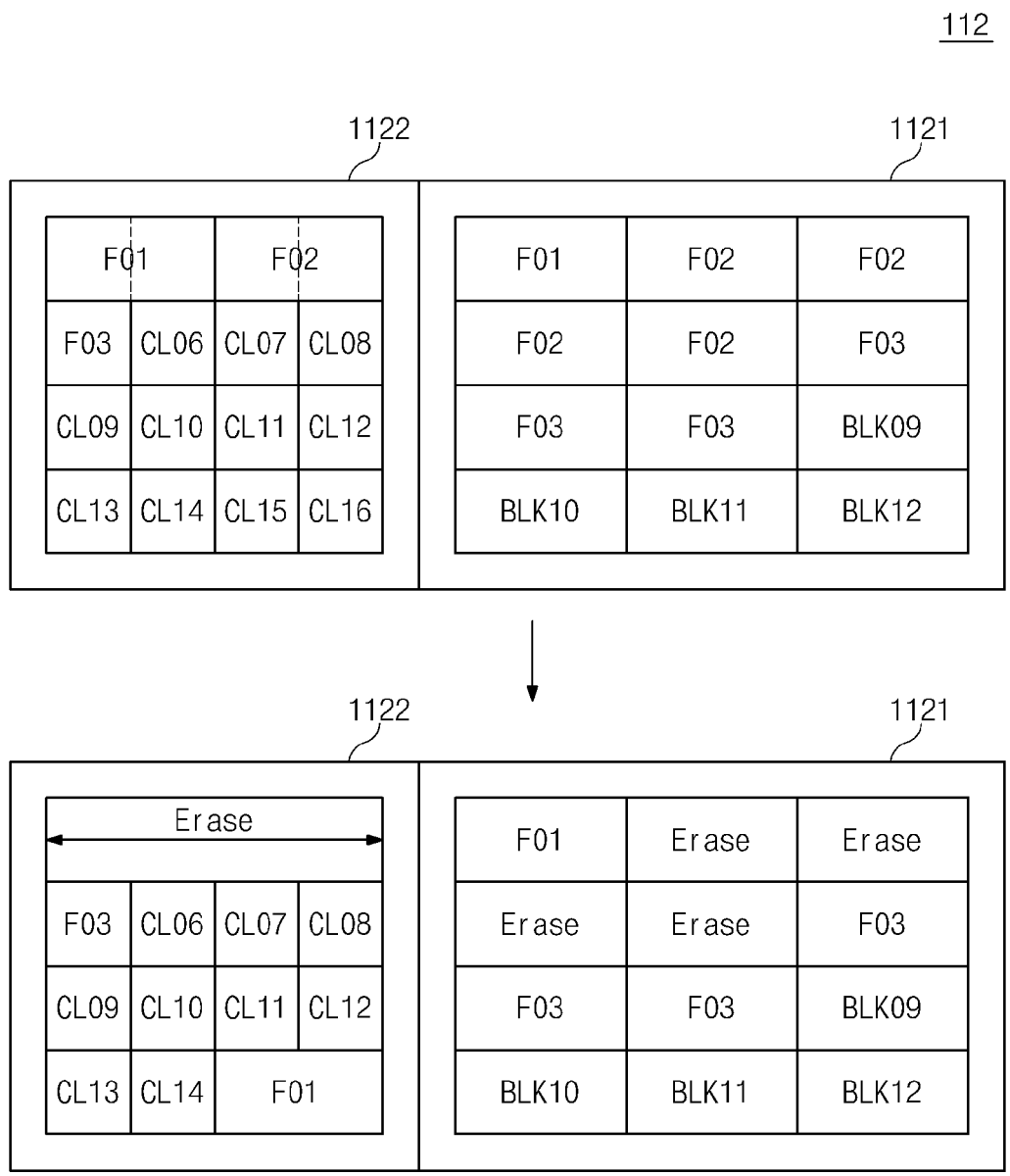
FIG. 6 is a diagram illustrating conditions of a management information field and a data field during an erasing operation, according to an embodiment of the present invention.

FIG. 6 is a diagram showing conditions of the management information field and the data field in an erasing operation, according to an illustrative embodiment.

Referring to FIG. 6, the cluster block BLK01 of the first data region 1121 and the clusters CL01 and CL02 of the second data region 1122 store data of the first file F01 (i.e., first file data). The cluster blocks BLK02~BLK05 of the first data region 1121 and the clusters CL03 and CL04 of the second data region 1122 store data of the second file F02 (i.e., second file data). The cluster blocks BLK06~BLK08 of the first data region 1121 and the cluster CL05 of the second data region 1122 are storing data of a third file F03 (i.e., third file data).

When the memory array 110 is a flash memory array, the erasing operation is performed in block units. As the predetermined cluster blocks of the first data region 1121 are storing the same file data, data from different files are not present simultaneously in the same cluster block. Therefore, when there is a request for erasing the second file data, the second file data is erased from the cluster blocks BLK02~BLK05 of the first data region 1121 by block unit.

To erase the rest of the second file data, the erasing operation is conducted in the clusters CL03 and CL04 of the second data region 1122. However, because the erasing operation is performed in the block units, other file data of the first file F01, stored in CL01 and CL02 of the clusters CL01~CL04 in the same cluster block, would be removed while erasing the second file data. Thus, it is necessary to copy the first file data, stored in the clusters CL01 and CL02, which are not to be erased, into an arbitrary area. For example, the first file data, which has not been requested for erasing, may be copied into an arbitrary area of empty clusters (e.g., CL15 and CL16) in the data field 112. Then, all of the data, including the second file data, may be erased from the clusters CL01~CL04 of the second data region 112.

The arbitrary area into which the first file data F01 are copied may be assigned to the clusters CL15 and CL16, for example, as shown in FIG. 6. However, it is understood that other arbitrary area(s) may be selected for storing the first file data.

As previously described, when erasing file data from the first data region 1121 in block units, there is no need of copying (or migrating) data, which is not to be erased, into another area, as in conventional systems. Only data, which is not to be erased, from the second data region 1122 must be copied to another area. As a result, the information processing device 100 is able to conduct the erasing operation more efficiently.

Consequently, the file management system of the information processing device 100, according to the present embodiment, is able to more efficiently manage files and improve the operational performance.

Figure 7:
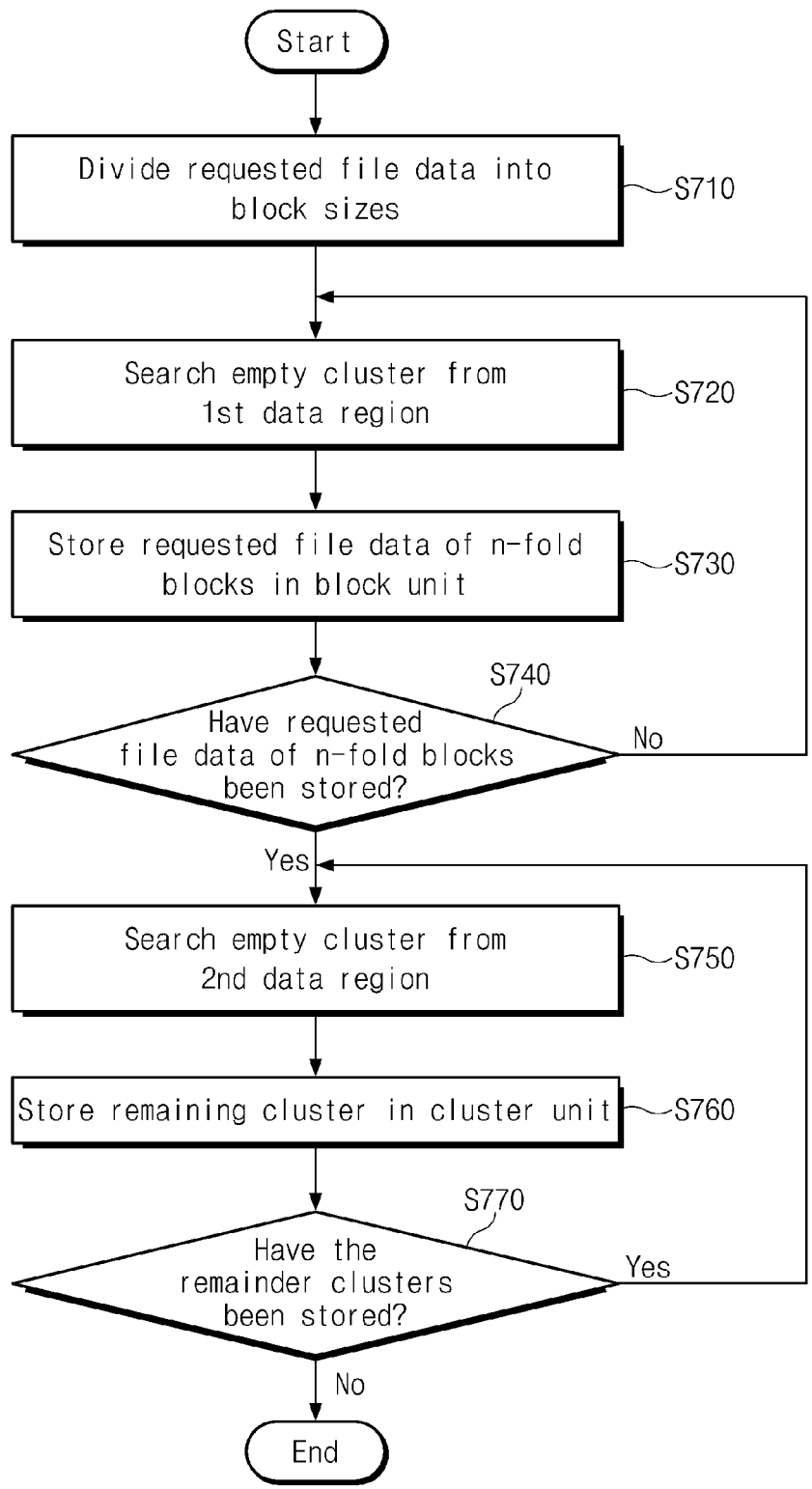
FIG. 7 is a flow chart illustrating a writing operation by the information processing device, according to an embodiment of the present invention.

FIG. 7 is a flow chart showing a writing operation by the information processing device, according to an illustrative embodiment of the present invention.

Referring to FIG. 7, the information processing device 100 divides data of a write-requested file into block sizes at step S710. The divided write-requested file data may include one or more cluster blocks of data and one or more remaining clusters of data. The divided write-requested file data are to be stored in cluster blocks of the first data region 1121, e.g., one block unit at a time, until all the cluster blocks are stored. For example, at step S720, the first data region 1121 is searched for an empty cluster block with reference to information stored in the management information field 111 in order to store a block of the write-requested file data, which is n times the unit block size (i.e., n times of F or n-fold blocks, where n is a positive integer). The write-requested file data of block n are stored in the empty cluster block of the first data region 1121 in the unit of block (S730). At step S740, it is determined whether the write-requested file data of all n-fold blocks has been stored completely. When the write-requested file data of n-fold blocks has not been stored completely (S740), the process returns to steps S720 and S730 to store the next cluster block unit.

After fully storing the write-requested file data of n-fold blocks, the remainder of the write-requested file data are to be stored in empty clusters of the second data region 1122, e.g., one cluster unit at a time, until all the remaining clusters are stored. For example, at step S750, the second data region 1122 is searched for empty clusters with reference to information stored in the management information field 111 in order to store the remainder of the write-requested file data, which are in cluster units. A cluster unit of the remaining write-requested file data is stored in an empty cluster of the second data region 1122 at step S760. At step S770, it is determined whether the all remaining clusters of the write-requested file data have been completely stored. If the remainder of the write-requested file data has not been completely stored (S770), the process returns to steps S750 and S760. Once the rest of the write-requested file data has been stored, the writing operation with respect to the write-requested file data is terminated.

Figure 8:
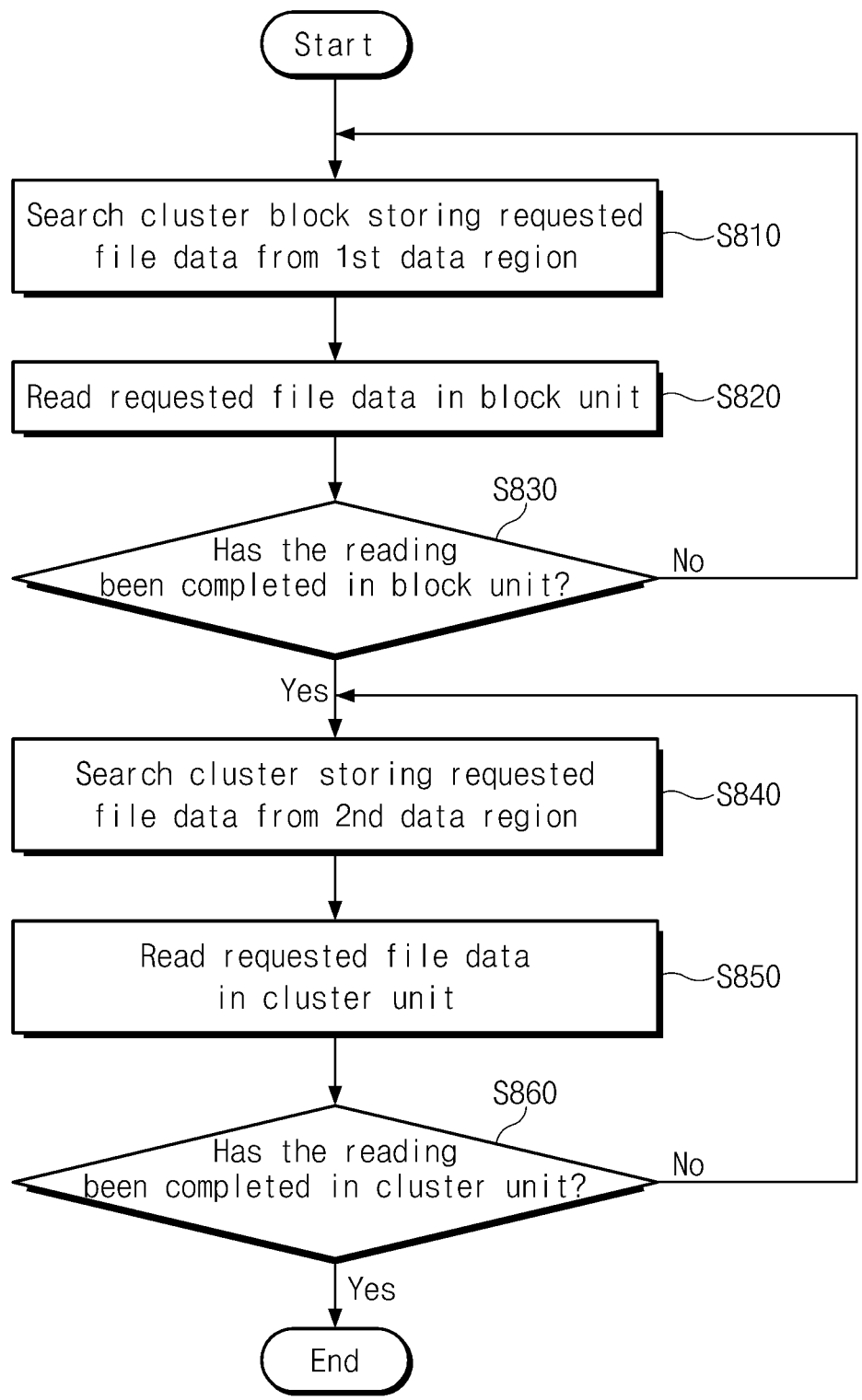
FIG. 8 is a flow chart showing a reading operation by the information processing device, according to an embodiment of the present invention.

FIG. 8 is a flow chart showing a reading operation by the information processing device, according to an illustrative embodiment of the present invention.

Referring to FIG. 8, the information processing device 100 searches the first data region 1121 for cluster blocks, which store data of a read-requested file, with reference to data field information and file information that are stored in the management information field 111 (S810). The read-requested file data are read out from the located cluster blocks of the first data region 1121 a block unit at a time until all the block units are read out. For example, in step S820, the read-requested file data are read out from a located block, and in step S830, it is determined whether the read-requested file data stored in block units have been read completely. If the read-requested file data have not been read completely (S830), the process returns to steps S810 and S820 for the next cluster block unit.

After fully reading the read-requested file data in block units, the information processing device 100 searches the second data region 1122 for clusters, which are storing the remainder of the read-requested file data, with reference to data field information stored in the management information field 111 (S840). The remainder of the read-requested file data is read out from the located clusters of the second data region 1122 a cluster at a time until all the remaining cluster units are read out. For example, in step S850, the read-requested file data are read out from a located cluster, and in step S860, it is determined whether the read-requested file data stored in cluster units have been read completely. If the read-requested file data have not been read completely (S860), the process returns to steps S840 and S850. After finally reading the rest of the read-requested file data, the reading operation is terminated with respect to the read-requested file data.

Figure 9:
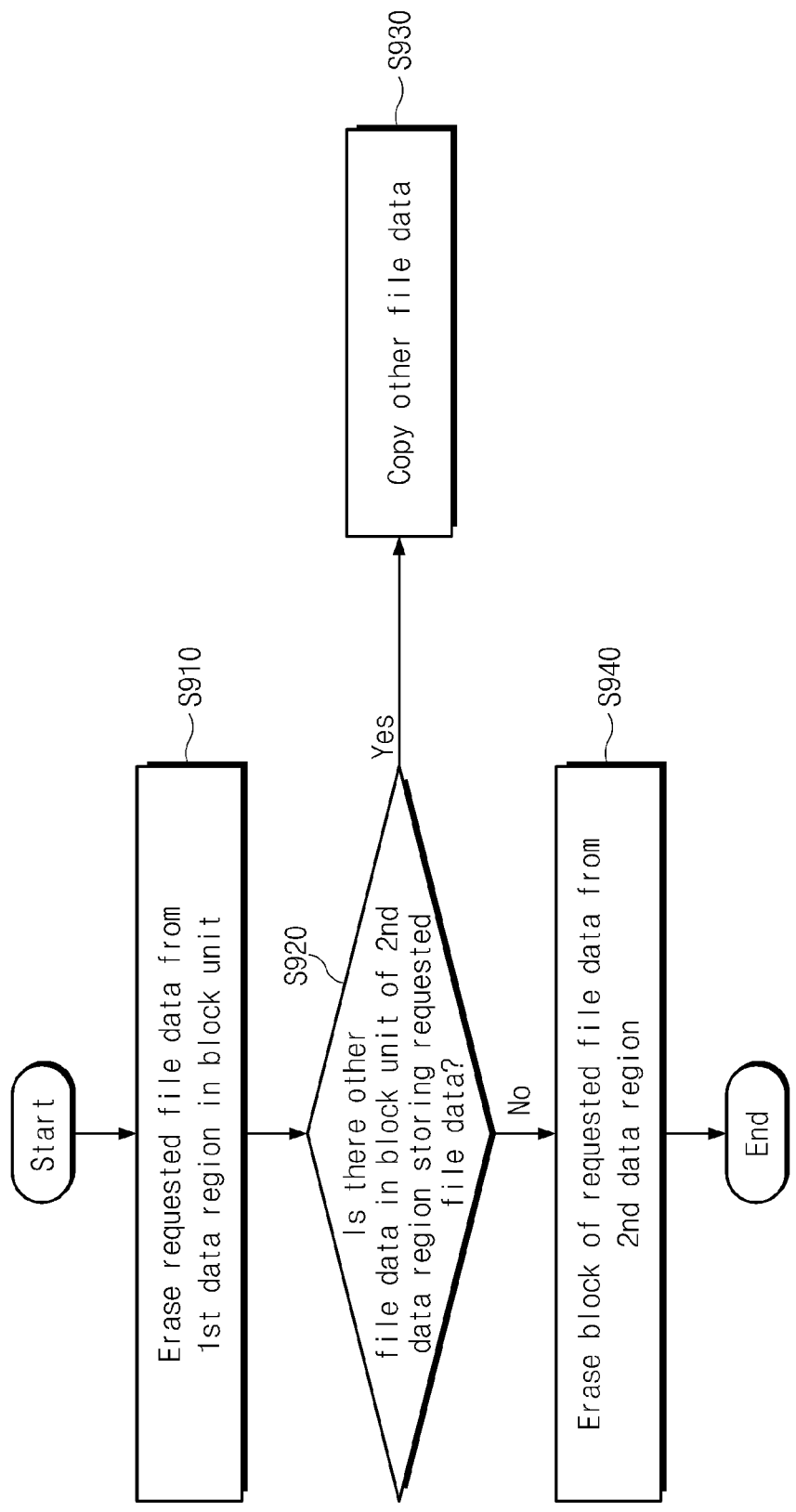
FIG. 9 is a flow chart showing an erasing operation by the information processing device, according to an embodiment of the present invention.

FIG. 9 is a flow chart showing an erasing operation by the information processing device, according to an illustrative embodiment of the present invention.

Referring to FIG. 9, in the erasing operation, the information processing device 100 operates to first erase the cluster blocks of the first data region 1121, which are storing data of an erase-requested file, in block units (S910). In step S920, block(s) of the second data region 1122 storing data of the erase-requested file are searched to determine whether they also store data from another file. For example, when there is data from another file in a block of the second data region 1122, the process progresses to step S930, in which the data from the other file is copied into an arbitrary data area from the block of the second data region 1122. When data from another file is not present in the block of the second data region 1122 storing the data of the erase-requested file, the process progresses to step S940 without first copying other file data. In step S940, the block of the second data region 1122, in which the erase-requested file data of the erase-requested file is stored, is erased in block units.

Accordingly, the file management system of the information processing device according to embodiments of the present invention more efficiently manages files and enhances performance.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An information processing device, comprising:
a memory array comprising a data field for storing file data and a management information field for storing information regarding the data field, the data field comprising a first data region formed of a plurality of cluster blocks, each cluster block including a predetermined number of clusters and having a predetermined size corresponding to the predetermined number of clusters, and a second data region formed of a plurality of clusters; and
a controller for controlling a writing operation to the memory array, the controller being configured to divide the file data into a first portion evenly divided by the predetermined cluster block size and a second portion corresponding to a remainder of the file data, to write the first portion of the file data in the first data region by block unit corresponding to the predetermined cluster block size, and to write the second portion of the file data in the second data region by cluster unit, with reference to the data field information of the management information field.

2. The information processing device as set forth in claim 1, wherein the management information field comprises a file allocation table for storing the data field information; and wherein the controller comprises:
a first controller for controlling the writing operation in block units in the first data region,
a second controller for controlling the writing operation in cluster units in the second data region, and
a data processor for dividing the file data by the predetermined cluster block size to determine a positive integer, providing the first controller with the first portion of the file data corresponding to the product of the positive integer and the cluster block size, and providing the second controller with the second portion of the file data.

3. The information processing device as set forth in claim 2, wherein the file allocation table comprises a plurality of entries corresponding to the clusters of the data field, the plurality of entries storing use status information corresponding to the clusters.

4. The information processing device as set forth in claim 3, wherein the entries identify the clusters of the data field as being used by one of the first and second controllers and store link information indicating locations of next data.

5. The information processing device as set forth in claim 3, wherein the first controller searches for empty cluster blocks, with reference to cluster information stored in the entries corresponding to a first cluster of each of the cluster blocks of the first data region, and stores the file data, which corresponds to the product of the positive integer and the predetermined cluster block size, in the empty cluster blocks from the data processor in block units.

6. The information processing device as set forth in claim 3, wherein the second controller searches for empty clusters, with reference to information stored in the entries of the clusters of the second data region, and stores the second portion of the file data in the empty clusters from the data processor in cluster units.

7. A writing method for an information processing device having a data field that includes a first data region formed of a plurality of cluster blocks, each cluster block including a predetermined number of clusters and having a predetermined size corresponding to the predetermined number of clusters, and a second data region formed of a plurality of clusters, the method comprising:
(a) dividing a write-requested file data by the predetermined cluster block size to determine a positive integer and a remainder;
(b) finding a number of empty cluster blocks in the first data region corresponding to the positive integer;
(c) writing first file data in the found empty cluster blocks by cluster block unit corresponding to the predetermined cluster block size;
(d) finding at least one empty cluster in the second data region corresponding to the remainder; and
(e) writing second file data in the found at least one empty cluster by cluster unit corresponding to a predetermined cluster size.

8. The method as set forth in claim 7, wherein the first file data is sequentially stored until the first file data is completely stored in the at least one cluster block corresponding to the positive integer by step (c), and
wherein the second file data is sequentially stored until the second file data is completely stored in the at least one cluster corresponding to the positive integer by step (e).

9. An information processing device comprising:
a memory array comprising a data field for storing file data and a management information field for storing information of the data field and information of the file data, the data field comprising a first data region formed of a plurality of cluster blocks, each cluster block including a predetermined number of clusters and having a predetermined size corresponding to the predetermined number of clusters, and a second data region formed of a plurality of clusters, a first portion of the file data, evenly divisible by the predetermined cluster block size, being stored in the first data region in block units corresponding to the predetermined cluster block size; and
a controller for controlling a reading operation to the memory array, the controller being configured to read the first portion of the file data from the first data region in block units, with reference to the data field information and the file data information that are reserved in the management information field, and to read a second portion of the file data, corresponding to a remainder of the file data from the second data region in cluster units.

10. The information processing device as set forth in claim 9, wherein the management information field comprises a file allocation table for storing the data field information;
wherein the controller comprises:
a first controller for controlling the reading operation in block units; and
a second controller for controlling the reading operation in cluster units; and
wherein the file data information is reserved in an arbitrary area of the management information field.

11. The information processing device as set forth in claim 10, wherein the file allocation table comprises multiple entries corresponding to the clusters of the data field, the multiple entries storing link information and use status information corresponding to the clusters.

12. The information processing device as set forth in claim 11, wherein the link information indicates clusters storing file data to be subsequently read.

13. The information processing device as set forth in claim 10, wherein the file data information includes information identifying a start cluster, and
wherein the first controller reads data from cluster blocks, which include the start cluster and store the file data, in block units with reference to the start cluster information.

14. The information processing device as set forth in claim 11, wherein the first controller reads data from cluster blocks, which store the subsequent data, in block units with reference to the link information stored in the entries corresponding to the last clusters of the cluster blocks of the first data region that store the file data.

15. The information processing device as set forth in claim 11, wherein the second controller reads data from clusters, which store the subsequent data, in cluster units with reference to the link information stored in the entries corresponding to the clusters of the second data region that store the file data.

16. A reading method for an information processing device having a data field for storing file data, the data field including a first data region formed of a plurality of cluster blocks, each cluster block including a predetermined number of clusters and having a predetermined size corresponding to the predetermined number of clusters, and a second data region formed of a plurality of clusters, the method comprising:
(a) searching the first data region for cluster blocks storing first data of a read-requested file, the first data being a portion of the file data evenly divisible by the predetermined cluster block size;
(b) reading the first data from the cluster blocks of the first data region in cluster block units corresponding to the predetermined cluster block size;

(c) searching the second data region for clusters storing second data of the read-requested file; and (d) reading the second data from the clusters of the second data region in cluster units corresponding to a predetermined cluster size.

17. The method as set forth in claim 16, wherein the first data is sequentially read from the cluster blocks of the first data region by block unit until the data of the read-requested file is completely read out from the cluster blocks of the first data region by the step (b), and wherein the second data is sequentially read from the clusters of the second data region by cluster unit until the data of the read-requested file is completely read out from the clusters of the second data region by the step (d).

18. An information processing device comprising:

a data field comprising a first data region formed of multiple cluster blocks, each of which including a predetermined number of clusters and having a predetermined size corresponding to the predetermined number of clusters, and a second data region including clusters, the first data region storing a first portion of file data evenly divisible by the predetermined cluster block size and the second data region storing a second portion corresponding to a remainder of the file data in cluster units;

a first controller for erasing the first portion of the file data from the first data region in block units corresponding to the predetermined cluster block size; and a second controller for erasing the second portion of the file data from the second data region in cluster units corresponding to a predetermined cluster size, wherein, when a block of the second data region includes other data from another file excluded from an erasing request, the second controller copies the other data to an arbitrary data area before erasing the second portion of the file data.

19. An erasing method for an information processing device comprising a data field for storing file data, the data field including a first data region formed of a plurality of cluster blocks, each cluster block including a predetermined number of clusters and having a predetermined size corresponding to the predetermined number of clusters, and a second data region formed of a plurality of clusters, the method comprising:

erasing a first portion of erase-requested file data from cluster blocks of the first data region in cluster block units corresponding to the predetermined cluster block size, the first portion being a portion of the file data evenly divisible by the predetermined cluster block size;

locating other file data, that is not to be erased, in a block of the second data region that includes a second portion of the erase-requested file data corresponding to the remainder of the file data; and copying the other file data into an arbitrary data area and erasing the block of the second data region that stores the second portion of erase-requested file data in cluster unit corresponding to a predetermined cluster size.

\* \* \* \* \*